United States Patent [19]

Bokelmann

[11] 4,222,722
[45] Sep. 16, 1980

[54] DEVICE FOR SYNCHRONIZING THE MOVEMENT OF THE COVER WEB AND BASE WEB DURING THE CONTINUOUS PRODUCTION OF RECTANGULAR FOAM BLOCKS

[75] Inventor: Horst Bokelmann, Bad Wildungen, Fed. Rep. of Germany

[73] Assignee: Metzeler Schaum GmbH, Memmingen, Fed. Rep. of Germany

[21] Appl. No.: 23,729

[22] Filed: Mar. 26, 1979

[30] Foreign Application Priority Data

Mar. 25, 1978 [DE] Fed. Rep. of Germany ....... 2813137

[51] Int. Cl.² ............................................ B29D 27/04
[52] U.S. Cl. ....................................... 425/89; 264/51; 264/DIG. 84; 425/817 C
[58] Field of Search .................. 264/54, 51, 53, 45.8, 264/46.2, 46.3, DIG. 84; 425/4 C, 817 C, 89

[56] References Cited

U.S. PATENT DOCUMENTS

| | | | |
|---|---|---|---|
| 3,065,500 | 11/1962 | Berner | 264/53 X |
| 3,178,768 | 4/1965 | Edberg | 264/53 X |
| 3,249,486 | 5/1966 | Voisinet et al. | 264/46.2 X |
| 3,354,503 | 11/1967 | Joseph et al. | 264/DIG. 84 |
| 3,408,690 | 11/1968 | Jacob | 263/53 X |
| 3,487,143 | 12/1969 | Bergvall | 264/51 X |
| 3,702,274 | 11/1972 | Wooler | 425/4 C X |
| 3,726,951 | 4/1973 | Smith et al. | 264/53 X |
| 3,751,197 | 8/1973 | Petzetaris | 264/46.2 X |
| 3,880,559 | 4/1975 | Peille | 264/46.2 X |
| 3,942,925 | 3/1976 | Schmitzer et al. | 264/46.3 X |
| 4,056,595 | 11/1977 | Bokelmann | 264/51 X |
| 4,082,824 | 4/1978 | Del Carpio | 264/DIG. 84 |
| 4,097,210 | 6/1978 | Romanillos | 425/817 C X |

FOREIGN PATENT DOCUMENTS

2165902 8/1973 Fed. Rep. of Germany .
2438285 8/1975 Fed. Rep. of Germany .
2517664 11/1976 Fed. Rep. of Germany .

*Primary Examiner*—Philip Anderson
*Attorney, Agent, or Firm*—Herbert L. Lerner

[57] ABSTRACT

In a method of continuously producing rectangular foam blocks wherein a foamable polyurethane-reaction mixture is deposited on a bottom web moved by a conveyor belt, the surface of the rising foam is covered by a cover web which is withdrawn from the foam surface by a deviating device disposed near a location at which the foaming of the mixture is terminated, and the cover web is further advanced by means of a deviating roller, a method of synchronizing the movements of the cover web and the bottom web includes driving the deviating roller, through a transmission coupled to the conveyor belt, at a peripheral speed that is synchronized with the conveyor speed of the conveyor belt, and passing the cover web between the deviating roller and a roller adjustable in elevation and in pressure contact with the deviating roller.

4 Claims, 1 Drawing Figure

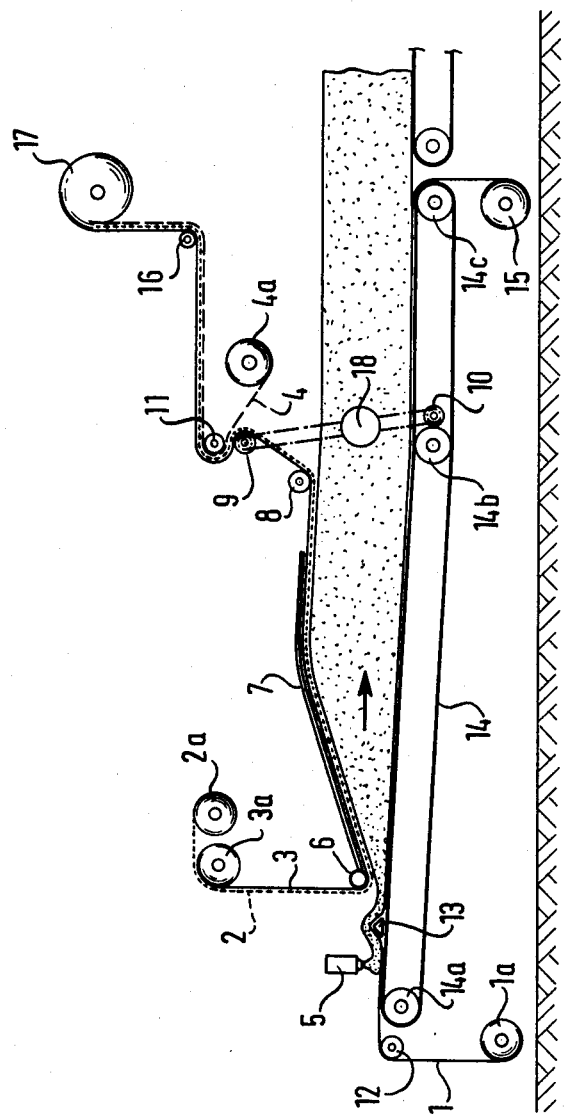

DEVICE FOR SYNCHRONIZING THE MOVEMENT OF THE COVER WEB AND BASE WEB DURING THE CONTINUOUS PRODUCTION OF RECTANGULAR FOAM BLOCKS

The invention relates to the utilization of a device for continuously producing rectangular foam blocks and, more particularly, to such a device wherein a foamable polyurethane reaction mixture is foamed on a base web displaced by a conveyor belt, and a cover web is applied to the surface of the foam, the cover web being withdrawn by a deflecting or rerouting device from the foam surface nearly at a location at which the foaming process is terminated.

Furthermore, the invention relates to a device for carrying out the foregoing method.

With such a device, the formation of a convexly curved surface of the foam blocks during the foaming process is avoidable. Such a curve is produced, on the one hand, due to lateral adhesion of the sides of the block to the lateral limiting surfaces of the machine and, on the other hand, due to the formation of a solid or firm skin at the surface which stretches arcuately. The arches or domes resulting therefrom can generally not be utilized so that they must be cut away as waste. This undesired dome formation can be avoided due to such a method wherein the block surface is kept flat or planar by the cover web.

The manner of operation and the disadvantages of the heretofore known methods of this general type are first explained hereinafter with reference to the accompanying single FIGURE of the drawing.

As shown in the FIGURE, a base or bottom web 1 generally formed of paper is unwound from a roll 1a, runs over a guide or deviating roller 12 onto a conveyor belt 14 driven by several rollers 14a, 14b and 14c and is moved thereby in forward direction i.e. in direction toward the right-hand side of the figure. Behind or downstream of the conveyor belt 14, i.e. after the base web 1 has run off the roller 14c at the right-hand side of the figure, the base web 1 is then wound on a roll 15.

Foamable polyurethane reaction mixture is applied from a mixer head 5 located above the base web 1 onto the latter. A cover web 2, 3 is placed, through a deviating tube 6, upon the surface of the risen foam in the illustrated zone thereof. This cover web 2, 3 is formed of a paper web or an air-permeable fleece 2 unwound from a roll 2a and directly engaging the foam surface, as well as a paper web 3 unwound from a roll 3a. If, instead of a fleece, a paper web 2 is used, then the use of a second paper web 3 can be dispensed with.

The deviating tube 6 is adjustable pneumatically by a conventional means both with respect to the vertical position thereof as well as the position thereof in direction of travel of the conveyor belt 14, as indicated by the arrow associated therewith.

The paper web or fleece 2 and the possibly used paper web 3 are withdrawn from the surface of the foam block over a deviating or guide roller 8 pneumatically adjustable in the elevational position thereof and over a stationary guide or deviating roller 9.

The deviating roller 8, as viewed in travel direction of the conveyor belt 14, shown in the figure, is located behind, i.e. downstream of, the location at which the rising foam has attained its maximal height.

The cover web 2, 3 is subjected to a controllable tensile stress so that a controllable force is exerted upon the surface of the rising foam.

This tensile stress can be produced, for example, by means of the deviating tube 6 and the deviating roller 8.

In addition, a lath flooring or duck board 7 is provided which is suspended from the deviating tube 6 and lies on the cover web 2, 3. Because of the weight of the board or flooring 7, it exerts pressure upon the surface of the rising foam so that no domes can form, but rather rectangular foam blocks are produced.

The width of the lath flooring or frame 7 can also be adjustable pneumatically by any conventional means.

The conventional method hereinafore-described is known, for example, from German Published Nonprosecuted Application DE-OS 2 165 902.

The hereinaforedescribed method is beset by the problem of moving the cover web, which is formed of the paper 3 and the fleece 2 or only of the paper web 3, exactly in synchronism with the bottom or base web 1 or with the conveyor speed of the conveyor belt 14. Otherwise, the instant a given difference in speed between the movements of the cover web 2, 3 or 3 and of the bottom or base web 1 or the conveyor belt 14 is reached, shear stresses are exerted upon the surface of the hardening foam block which form cracks or fissures within the foam block. Foam blocks having fissures or cracks therein are not suited, however, for mattress manufacture, for example, because a very great amount of waste is produced during the cutting thereof.

An obvious possibility of solving the foregoing problem would be to synchronize the rotary speed of the take-up or wind-up roll for the cover web 2, 3 or 3 with the conveyor speed of the conveyor belt 14. Such a solution is not practical, however, because, at a uniform or constant rotary speed of the wind-up or take-up roll, the peripheral velocity thereof varies as the cover web 2, 3 or 3 is being continuously wound thereon due to the ever increasing wind-up radius thereof.

In a method heretofore known from German Published Nonprosecuted Application DE-OS 2 438 285, the pins or thorns of a pin or thorn roller are pressed through the cover web into the surface of the block, thereby forcibly ensuring synchronization of the movement of the cover web with that of the bottom or base paper 1. A disadvantage of such a method, however, is that the surface of the block is thereby also damaged by these pins or thorns.

In the method known heretofore from German Published Nonprosecuted Application DE-OS 2 517 664, this synchronization is achieved by guiding the upper paper web 3 over the deviating or guide roller 8 out of the device and feeding it back again over another deviating or guide roller as the bottom or base web 1. For this purpose, however, adequate space for guiding or returning the unwound cover web, which has a width of from 50 to 220 cm, must be made available above and behind the device.

It is accordingly an object of the invention to provide a method and device for continuously producing rectangular foam blocks wherein the hereinaforementioned disadvantages of previously known methods and devices of these generally known types are avoided. More particularly, it is an object to provide such a method and device wherein exact synchronization of the motion of the cover web and the bottom or base web is effected without damaging the foam block and without great expense with respect to space requirements and construction.

With the foregoing and other objects in view, there is provided in accordance with the invention, in a method for continuously producing rectangular foams blocks wherein a foamable polyurethane-reaction mixture is deposited on a bottom web moved by a conveyor belt, the surface of the rising foam is covered by a cover web which is withdrawn from the foam surface by a deviating device disposed near a location at which the foaming of the mixture is terminated, and the cover web is further advanced by means of a deviating roller, a method of synchronizing the movements of the cover web and the bottom web which comprises driving the deviating roller, through a transmission coupled to the conveyor belt, at a peripheral speed that is synchronized with the conveyor speed of the conveyor belt, and passing the cover web between the deviating roller and a roller adjustable in elevation and in pressure contact with the deviating roller.

In accordance with another aspect of the invention, there is provided a device for carrying out the foregoing method of synchronizing the movements of the cover web and the bottom web, comprising transmission means coupled to the conveyor belt and connected to the deviating roller for advancing the cover web for driving the deviating roller at a peripheral speed synchronized with the conveyor speed of the conveyor belt, and a roller adjustable in elevation so as to be in pressure contact with the deviating roller, with the bottom web disposed therebetween.

In accordance with a further feature of the invention, the device includes another web introducible between the cover web covering the surface of the foam and the pressure-contacting roller.

In accordance with an additional feature of the invention, the device includes, in a transition of the cover web from the conveyor belt to the deviating roller, speed transmission means for adjusting the speed of the cover web so as to slightly lead or trail the speed of the bottom web.

In accordance with a concomitant feature of the invention, the device includes means for moving the bottom web at a speed greater than the speed of the cover web.

The advantages attained by the invention are derived especially from the fact that the deviating roller is driven by transmission means coupled to the conveyor belt so that the deviating roller has a peripheral speed that is in synchronism with the conveyor speed of the conveyor belt. In this regard, the coupling is advantageously effected with a drive roller of the conveyor belt. A pressure roller which is adjustable in elevation engages the deviating roller so that the cover web is passed between the deviating roller and the pressure roller with a speed that is exactly in synchronism with the conveyor speed of the conveyor belt. In this manner, the hereinaforementioned fissures or cracks that might otherwise form in the surface of the foam blocks are avoided, without having to accomplish this by pins or needles or by great space and constructional expenditures.

Since the possibility exists that the pressure roller contacting the deviating roller may become soiled by the foam-covered cover web and, especially the fleexe, the pressure roller must be kept clean during continuous practice of such a method. For this purpose, another, inexpensive paper or fleece can be introduced between the cover web formed of the first-mentioned paper web or fleece or, if desired, the paper web and fleece combination, and the pressure roller, so that the pressure roller does not come into contact directly with the foam present on the first-mentioned paper or fleece.

Through testing, it has been determined that the manufactured block foam has a quality which corresponds to that provided by the hereinaforementioned previously known method according to the German Published Nonprosecuted Application DE-OS 2 517 664 without having to return the cover web as a bottom web with the great constructional and spatial expense associated therewith. Also, the fleece which is additionally used, if desired or necessary, has only a slight effect upon the manufacturing costs.

A correct rectangular shape and the best block surface are attainable if the cover web exerts a relatively high pressure on the rising foam. On the other hand, the tensile stress exerted by the roller pair on the cover web can, however, become so high due to increasing friction between the cover web and the rollers or, possibly also, the lath flooring or frame, so that fissures or cracks can occur in the cover web.

It is therefore advantageous to employ cover paper having a weight of at least 90 g/m$^2$ which is considerably more resistant or stronger than the otherwise employed paper having a weight of about 50 g/m$^2$. The slight additional costs resulting therefrom are, however, balanced or equalized by economizing on waste, so that actually an ultimate cost-reduction is obtained.

The paper for the bottom web ought also to have a weight in the order of magnitude of 90 g/m$^2$, in order to ensure a fold- or crease-free introduction on in-feed thereof.

As noted hereinbefore, speed transmission means, according to the invention, are provided in a transition of the cover web from the conveyor belt to the deviating roller, through the aid of which the speed of the cover web is variable or adjustable slightly with respect to the speed of the bottom web. In this regard, if the speed of the cover web is somewhat less than that of the bottom web, the quality of the block surface is able to be improved in given applications.

The pressure upon the surface of the rising foam can be produced by tensile stress exerted upon the cover web with the aid of the two rollers. In addition, a lath floor or frame or several, such as especially five, equalizing tubes electromotively adjustable in elevation can be provided on the cover web. These equalizing tubes are even more operationally or functionally reliable than is the lath flooring, because the friction thereof with the cover web is lower and smaller mechanical expense is required.

Finally, the following problem occurs with the heretofore known device of the foregoing general type. When the reaction mixture is initially deposited upon the bottom web, no sharply defined starting line is formed but rather, the yet-liquid reaction mixture runs over the bottom web, so that the forward or leading edge of the foam block generally has an irregular shape and must therefore be cut away as waste.

In order to form a regular or uniform forward or leading edge of the foam block, in accordance with yet another embodiment, the bottom web is therefore guided over a projection extending perpendicularly to the transport direction of the conveyor belt at a location behind or downstream from the location at which the reaction mixture is applied, as viewed in flow direction of the mixture, so that, at this downstream location, a small rise is formed which the yet-liquid reaction mixture can not surmount. An exactly defined leading or forward edge is thus produced thereby, from which the mixture can foam during the reaction.

This projection can be formed, for example, by a roller or bar disposed between the conveyor belt and the bottom web, and over which the bottom web is drawn away.

Other features which are considered as characteristic for the invention are set forth in the appended claims.

Although the invention is illustrated and described herein as embodied in method and device for continuously producing rectangular foam blocks, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single FIGURE of the drawing which is a diagrammatic and schematic view of a device for performing the method of synchronizing the movement of the cover web and the bottom web in apparatus for continuously producing rectangular foam blocks, in accordance with the invention.

Referring now again to the FIGURE of the drawing, the cover web formed of paper or an air-permeable fleece 2 and, if desired or necessary, of a paper web 3 having a weight of 90 g/m², as described hereinbefore, is withdrawn at the deviating roller 8 from the surface of the foam block and guided over a further, stationary deviating roller 9, in pressure-contact with which, under a given or predetermined pressure, a roller 11, pneumatically adjustable in elevation, is disposed. The deviating roller 9 is coupled through a transmission 10 with a drive roller 14b of the conveyor belt 14 in such a manner that the deviating roller 9 rotates at a speed which has an exactly defined relationship to the conveyor speed of the conveyor belt 14, such as, for example, equal to the conveyor speed or somewhat lower than the conveyor speed. The exact relationship between the conveyor speed of the conveyor belt 14 and the speed of the deviating roller 9 can be adjusted by a conventional controllable speed transmission 18 which is disposed in the transition from the transmission 10 to the deviating roller 9.

The bottom web 1, which is likewise formed of paper having a weight of 90 g/m², and the cover web 2, 3 are thereby moved or displaced in synchronism.

From another roll 4a, a further paper or fleece 4 is introduced between the deviating roller 9 and the pressure roller 11 in such manner that the paper or fleect 4 is located between the surface of the paper or fleece 2, to which foam residue adheres, and the pressure roller 11. In this way, the foam residue is prevented from soiling or dirtying the pressure roller 11. After the paper or fleece 2, the paper web 3 and the further paper or fleece 4 have been guided between the deviating roller 9 and the pressure roller 11, they are conducted over a further deviating roller 16 and finally wound up on a take-up or wind-up roll 17.

Between the location at which the reaction mixture is applied to the bottom web 1 and the location at which the cover web 2, 3 is placed upon the rising foam i.e. between the mixer head 5 and the deviating roller 6, the bottom web 1 runs over a bar 13 disposed between the conveyor belt 14 and the bottom web 1, the ends of the bar 13 extending somewhat beyond the surface of the conveyor belt 14. A small rise is thereby formed in the surface of the bottom web 1 thereat, so that liquid reaction mixture applied by the mixer head 5 to the bottom web 1 cannot surmount this rise and, thus, a smooth rectilinear forward or leading edge of the rising foam is defined thereby.

There is claimed:

1. Device for synchronizing the movement of the cover web and base web during continuous production of rectangular foam blocks, comprising means for producing a rising foamable polyurethane reaction mixture, a belt for transporting the reaction mixture, the base web being disposed between the reaction mixture and said belt, the cover web being disposed above the rising foam, deviating means for pulling the cover web from the foam at substantially the point where the foaming is completed, a deviating roller for guiding the cover web after removal from the foam, means coupled to said belt for driving said deviating roller with a circumferential speed which is synchronized with the forward speed of said belt, and a vertically adjustable pressure roller adjacent to said deviating roller for guiding and preventing slippage of the cover web on said deviating roller.

2. Device according to claim 1, including another web insertable between the cover web and said pressure roller.

3. Device according to claim 1 or 2, wherein said driving means includes means for varying the speed of the cover web relative to the speed of the base web.

4. Device according to claim 3, wherein said speed-varying means are means for driving the base web at a higher speed than the cover web.

* * * * *